US010218011B2

(12) United States Patent
Laurencin et al.

(10) Patent No.: US 10,218,011 B2
(45) Date of Patent: Feb. 26, 2019

(54) HIGH-TEMPERATURE OR FUEL-CELL ELECTROCHEMICAL SYSTEM HAVING IMPROVED THERMAL MANAGEMENT

(71) Applicant: COMMISSARIAT A L'ENERGIE ATOMIQUE ET AUX ENE ALT, Paris (FR)

(72) Inventors: Jerome Laurencin, Sassenage (FR); Gerard Delette, Grenoble (FR); Magali Reytier, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 1195 days.

(21) Appl. No.: 14/354,772

(22) PCT Filed: Oct. 26, 2012

(86) PCT No.: PCT/EP2012/071298
§ 371 (c)(1),
(2) Date: Apr. 28, 2014

(87) PCT Pub. No.: WO2013/060869
PCT Pub. Date: May 2, 2013

(65) Prior Publication Data
US 2014/0329161 A1 Nov. 6, 2014

(30) Foreign Application Priority Data

Oct. 28, 2011 (FR) ...................................... 11 59843

(51) Int. Cl.
*H01M 8/04* (2016.01)
*H01M 8/24* (2016.01)
(Continued)

(52) U.S. Cl.
CPC ............ *H01M 8/04067* (2013.01); *C25B 9/18* (2013.01); *C25B 15/00* (2013.01); *H01M 8/0267* (2013.01);
(Continued)

(58) Field of Classification Search
CPC ............ H01M 8/0267; H01M 8/04014; H01M 8/04029; H01M 8/04052; H01M 8/04067;
(Continued)

(56) References Cited

U.S. PATENT DOCUMENTS 2,347,957 A   5/1944   McCullough
3,623,913 A   11/1971  Adlhart et al.
(Continued)

FOREIGN PATENT DOCUMENTS

CN        1745493 A       3/2006
DE   10 2004 013 256    10/2005
(Continued)

OTHER PUBLICATIONS

Office Action dated Sep. 26, 2016 in Japanese Patent Application No. 2014-537641 (with English translation).
(Continued)

*Primary Examiner* — Ciel P Thomas
(74) *Attorney, Agent, or Firm* — Oblon, McClelland, Maier & Neustadt, L.L.P.

(57) ABSTRACT

An electrochemical system including a stack of a longitudinal axis with alternating ceramic cells and interconnectors and including a thermal management mechanism incorporated in the stack, the thermal management mechanism including plates having a structured lateral surface through which a thermal transfer by radiation towards outside of the stack takes place.

16 Claims, 9 Drawing Sheets

(51) Int. Cl.
*H01M 8/02* (2016.01)
*C25B 9/18* (2006.01)
*C25B 15/00* (2006.01)
*H01M 8/12* (2016.01)
*H01M 8/04007* (2016.01)
*H01M 8/2425* (2016.01)
*H01M 8/04014* (2016.01)
*H01M 8/04029* (2016.01)
*H01M 8/0267* (2016.01)
*H01M 8/2432* (2016.01)
*H01M 8/124* (2016.01)

(52) U.S. Cl.
CPC ... *H01M 8/04014* (2013.01); *H01M 8/04029* (2013.01); *H01M 8/04052* (2013.01); *H01M 8/04074* (2013.01); *H01M 8/2425* (2013.01); *H01M 8/2432* (2016.02); *H01M 8/124* (2013.01); *H01M 2008/1293* (2013.01); *Y02P 20/129* (2015.11); *Y02P 70/56* (2015.11)

(58) Field of Classification Search
CPC .............. H01M 8/04074; H01M 8/124; H01M 8/2425; H01M 8/2432; H01M 2008/1293; C25B 9/18; C25B 15/00; Y02P 20/129; Y02P 70/56
See application file for complete search history.

(56) References Cited

U.S. PATENT DOCUMENTS

| | | | |
|---|---|---|---|
| 4,574,112 A | 3/1986 | Breault et al. | |
| 5,401,595 A * | 3/1995 | Kagawa | H01M 2/0212 429/152 |
| 6,998,186 B2 * | 2/2006 | Sato | H01M 8/04007 429/437 |
| 2003/0082423 A1 * | 5/2003 | Kushibiki | H01M 8/0297 429/435 |
| 2005/0255340 A1 | 11/2005 | Watanabe et al. | |
| 2006/0105213 A1 | 5/2006 | Otsuka | |
| 2011/0117465 A1 | 5/2011 | Yajima et al. | |

FOREIGN PATENT DOCUMENTS

| | | |
|---|---|---|
| DE | 10 2007 033 428 | 1/2009 |
| EP | 1 387 424 A2 | 2/2004 |
| EP | 1 571 722 A1 | 9/2005 |
| EP | 2 284 936 | 2/2011 |
| EP | 2 355 204 | 8/2011 |
| GB | 2 151 840 | 7/1985 |
| JP | 7-233491 A | 9/1995 |
| JP | 2003-132933 A | 5/2003 |
| JP | 2003-346866 A | 12/2003 |
| JP | 2004-193027 A | 7/2004 |
| JP | 2004-273140 A | 9/2004 |
| JP | 2009-146858 | 7/2009 |
| JP | 2009-283150 A | 12/2009 |
| JP | 2010-161053 | 7/2010 |
| JP | 2010-277877 A | 12/2010 |

OTHER PUBLICATIONS

Preliminary Search Report dated Jul. 10, 2012 in French Patent Application No. FR 1159843 (with English translation of category of cited documents).
J. Laurencin, et al., "Modelling of solid oxide steam electrolyser: Impact of the operating conditions on hydrogen production", Journal of Power Sources, 196, 2011, pp. 2080-2093.
H. Apfel, et al., "Thermal start-up behaviour and thermal management of SOFC's", Journal of Power Sources 154, 2006, pp. 370-378.
Waldemar Bujalski, et al., "Cycling of three solid oxide fuel cell types", Journal of Power Sources, 171, 2007, pp. 96-100.
Abstract of the thesis of H. Gomart (with an English translation) of the thesis by Hector Gomart Entitled: "Modelisation des proprietes thermo-radiatives de revetements a haute efficacite energetique", Modeling of thermo-radiative properties of high emissive coatings, University of Orleans, France, 2008, 2 pages.
Rousseau, B., et al., "High emissivity of a rough Pr2NiO4 coating", Applied Physics Letters, vol. 79, No. 22, pp. 3633-3635, (Nov. 26, 2011) XP 012029525.
French Search Report dated Jul. 10, 2012 in French Application No. 1159843 Filed Oct. 28, 2011.
International Search Report dated Feb. 1, 2013 in PCT/EP12/071298 Filed Oct. 26, 2012.
Combined Chinese Office Action and Search Report dated Dec. 25, 2015 in Patent Application No. 201280059370.1 (with English Translation).
J. Hartvigsen, et al., "Carbon dioxide recycling by high temperature co-electrolysis and hydrocarbon synthesis", ECS Transactions, 12 (1), 2008, 625-637.

* cited by examiner

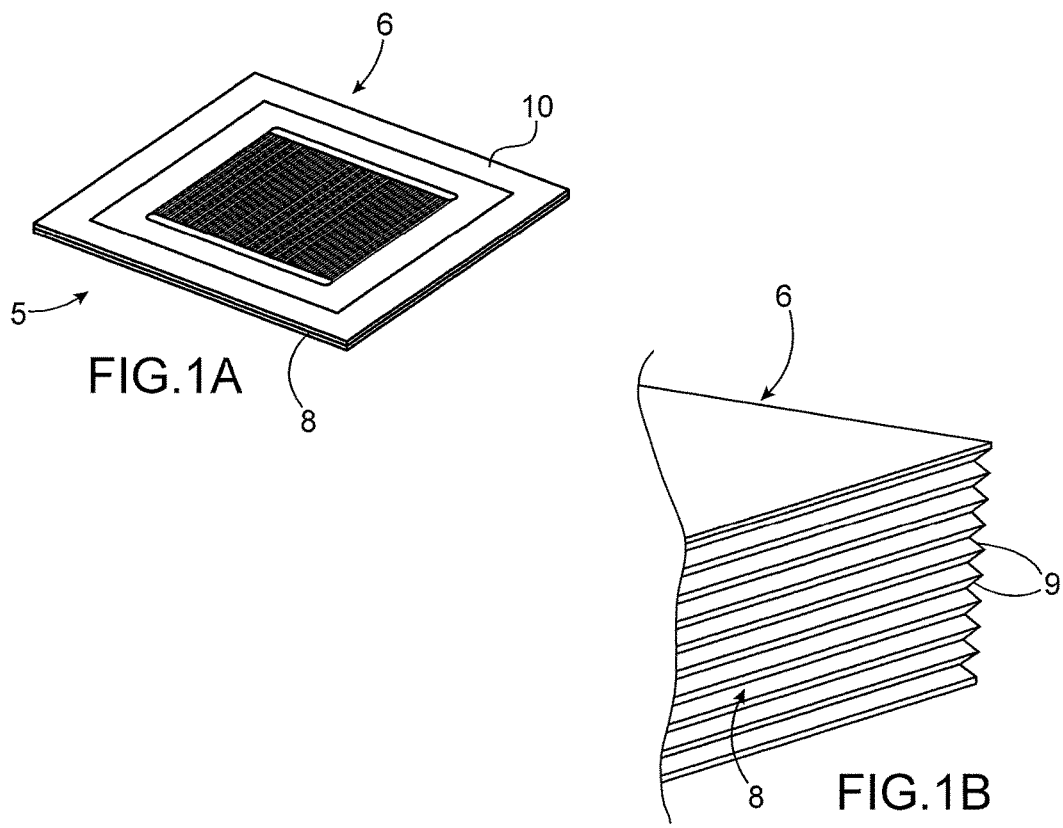
FIG.1A
FIG.1B
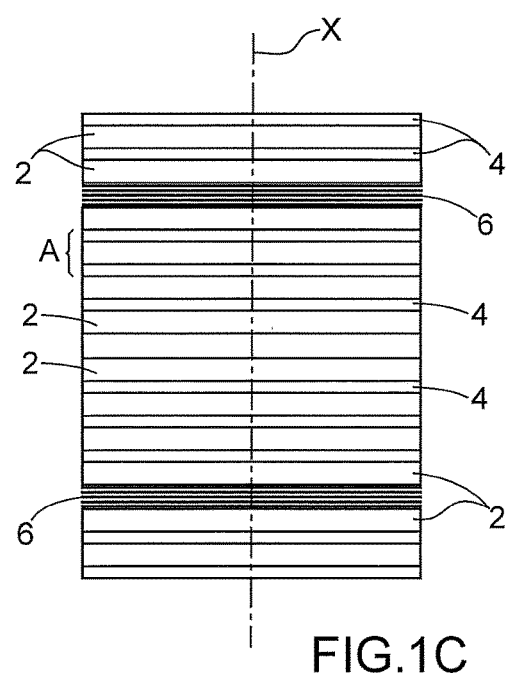
FIG.1C

HIGH-TEMPERATURE OR FUEL-CELL ELECTROCHEMICAL SYSTEM HAVING IMPROVED THERMAL MANAGEMENT

TECHNICAL FIELD AND PRIOR ART

The invention relates to electrolysers and fuel cell stacks operating at high temperature with improved thermal management.

High-temperature electrolysers are commonly called SOECs (Solid Oxide Electrolysis Cells). They accomplish electrochemical conversion from electrical and thermal power into chemical energy. The term co-electrolysis means operation in which a mix of steam and carbon dioxide, $H_2O/CO_2$, is fed into the electrolyser. The steam is transformed into hydrogen and the carbon dioxide is transformed into carbon monoxide, to act as energy carriers. Depending on demand, these $H_2/CO$ combustible gases may subsequently be converted into heat and into electricity, for example by means of an SOFC (Solid Oxide Fuel Cell) stack.

SOEC electrolysers and SOFC fuel cell stacks represent a reverse operation of the same electrochemical system. It will be noted that these systems are highly electrically efficient. In addition, great flexibility concerning the nature of the fuel is possible in SOFC mode. The stack can, for example, be supplied directly with natural gas. In this case the reforming of the methane as hydrogen takes place directly within the cells of the system.

The SOEC electrolysers and SOFC fuel cell stacks in question are formed by a stack of a large number of flat ceramic cells, where the electrochemical reactions take place, and generally metal interconnecting plates, interposed between each pair of ceramic cells. A cell has on each of its faces a ceramic layer constituting an electrode (anode or cathode), where the two electrodes of a given cell are insulated and separated by a ceramic membrane acting as the electrolyte.

The interconnection plates distribute the gases and collect the current in each of the two electrodes of a cell. In a stack the interconnection plates are structured on both sides so as to implement the collecting and distribution functions for the opposite electrodes of two consecutive cells positioned facing one another.

An assembly between one cell and the two interconnection plates surrounding it forms a defined elementary unit. In particular, an elementary unit contains the cathodic compartments (the location where the chemical species are reduced) and anodic compartments (the location of the oxidisation reactions), which are two sealed and electrically insulated volumes.

The heat transfers are made partly by the gases and by the heat exchanges between the edges of the stack and its insulating sheath. It will then be understood that the thickest possible elementary unit enables the exchange surfaces to be increased, and facilitates thermal management of the system. However, the interconnection plates are generally produced from pressed plates which are made as thin as possible, in order to increase the compactness of the electrochemical converter and to limit the costs. It therefore seems important to find a compromise between this constraint of compactness, which imposes a small volume, and the heat exchanges, which require large areas.

With stationary operation thermal management of the SOFC stacks occurs partly by modifying the rate of flow of air sent to the cathode. In addition, the internal reforming facilitates thermal control of the stack, since the endothermicity of the chemical reactions transforming the methane into hydrogen tends to balance the heat releases caused by electrochemical oxidisation of the hydrogen. However, during load transients or in phases when the system is switched on/off, temperature gradients appear and may cause mechanical damage to the stack.

In respect of thermal management of the SOECs, it has been shown that, depending on the operating voltage, the heat released by the operating reverse battery protection may be less than, equal to or greater than the heat absorbed by electrolysis of the steam. In the case of high steam conversion rates, the temperature of the electrolyser may change very rapidly to levels which are unacceptable for long-term operation of the system. Indeed, when operating in exothermic mode the hydrogen produced contains little heat. The flow of hydrogen being emitted by the electrolyser is not therefore able to evacuate large quantities of heat. It should also be mentioned that in the case of endothermic operation it may prove difficult to provide heat to the stack for optimal operation.

DESCRIPTION OF THE INVENTION

Consequently one aim of the present invention is to provide an electrochemical system, such as a high-temperature electrolyser or fuel cell with improved thermal management, providing great flexibility with regard to thermal management of the system, whether with stationary control or during transient operation.

The aim set out above is attained through the interposition, in a stack of elementary units formed by ceramic cells and interconnectors, of plates having a surface for heat transfer by radiation which is appreciably larger than that of the interconnectors, providing a radiating surface between the stack and, for example, a thermalised sheath.

This appreciably larger radiative surface is obtained by a structuring of the lateral surface of the radiative plate or plates. These plates are distributed in the stack, preferably periodically. They can be positioned either as replacements of certain interconnectors, in which case they are produced so as to provide the gas supply of the cells, or adjacent to interconnectors.

The term "structuring" is understood to mean the production of a relief on the surface of the plates so as to increase their heat exchange surface, the relief then being, for example, in the form of ribs forming fins. In addition, the term "heat transfer" in the present application is understood to mean the transfer of heat from the stack to the exterior, but also, in endothermic operating mode, transferring heat to the stack from the exterior to the stack.

By virtue of the invention the heat exchanges by radiated flows are greater the higher the temperature, since radiated flows are proportional to $T^4$. This thermal transfer mode is therefore low at ambient temperature, and becomes predominant at the operating temperature of an electrolyser of the SOEC type or SOFC type. It is particularly well-suited to electrolysers of the SOEC type and to SOFC stacks.

In a particularly advantageous embodiment, the radiative plates include lateral ridges protruding from the stack; the surfaces of the ridges perpendicular to the axis of the stack may then be structured, in addition to the lateral surface.

These plates are preferably thicker than the interconnectors, thus providing an even larger radiative lateral exchange surface.

The stack is then divided into sub-units of cells surrounded and separated by plates efficiently causing transfer by radiation. These plates are responsible for the transfer by radiation function. In electrolysers and cell stacks of the state of the art, a transfer by radiation takes place at the edges of the interconnectors, and these are very thin.

These plates are particularly efficient for thermal management of the stack since thermal transfer by radiation is the predominant method of heat transfer, and the most efficient method in stacks of cells of electrolysers and fuel cells.

In addition they allow a particularly suitable thermal management of the systems for which greater flexibility is demanded, for example in terms of reversibility, transient operation, variability of the input gases, etc.

One subject-matter of the present invention is then an electrochemical system including a stack of longitudinal axis with alternating ceramic cells and interconnectors, and also including thermal management means included in the stack, characterised in that said thermal management means include at least one plate positioned in the stack, called the "radiative plate", having at least one lateral edge with a surface through which a heat exchange takes place by radiation with the exterior of the stack, said surface being at least partly structured.

The radiative plate is advantageously thicker than that of the interconnectors, and the interconnectors can be between 0.1 mm and 15 mm thick, and at least one radiative plate is between 5 mm and 50 mm thick.

In a particularly advantageous example embodiment the radiative plate has a transverse section greater than that of the cells, and that of the interconnectors, such that it has a peripheral ridge protruding from the stack, said ridge havings a lateral edge the surface of which is at least partly structured.

The ridge has two longitudinal faces, one at least of which is at least partly structured.

The surface of the lateral edge and/or at least one longitudinal face is advantageously covered with a material having emissivity close to 1, for example $Pr_2NiO_{4+\delta}$.

The electrochemical system can include several radiative plates distributed throughout the stack. The radiative plates are preferably distributed periodically in the stack, for example in every 4 to 12 elementary units, where an elementary unit is formed by a ceramic cell and two interconnectors. According to an advantageous characteristics the radiative plate or plates periodically distributed in the stack replace interconnectors located at the ends of the assemblies of elementary units which they separate.

The electrochemical system can include a circuit supplying the ceramic cells with electrolysis gas.

The radiative plate can also include means for thermal transfer by convection. The means for thermal transfer by convection can be formed by channels made in the radiative plate, and extending roughly in the plate's plane, in which a fluid flows. The fluid can be either a fluid other from those used in the electrolysis reactions of the electrochemical system, or an electrolysis gas used in at least one of the electrolysis reactions of the electrochemical system, where the system then includes means connecting said channels to an electrolysis gas supply circuit.

The electrochemical system according to the invention can be a fuel cell which operates by reforming in natural gas, in which the channels are covered with a steam reforming catalyst, where the fluid is a natural gas.

The radiative plate can also include means for thermal transfer by conduction.

The radiative plate can also include a material which changes phase at the system's desired operating temperatures. The phase-change material is, for example, placed in a cavity.

The phase-change material can be a eutectic material having a solidus temperature close to 800° C. and a liquidus temperature close to 850° C.

Alternatively, the phase-change material can be a molten salt, for example NaCl.

In an advantageous example, at least two radiative plates have an electrical connection which is able to electrically insulate the cells located between said two radiative plates.

The electrochemical system according to the invention can be a high-temperature electrolyser, for example intended to produce hydrogen.

The electrochemical system according to the invention can be a fuel cell, in which the hydrogen consumed can be generated by steam reforming of natural gas.

BRIEF DESCRIPTION OF THE ILLUSTRATIONS

The present invention will be better understood using the description which follows and the appended illustrations, in which:

FIG. 1A is a perspective top view of a first example embodiment of a thermal management plate, FIG. 1B is a detailed view of a lateral edge of the radiative plate of FIG. 1A, FIG. 1C is a front view of an example embodiment of a stack including the thermal management plates of FIG. 1A, FIG. 2A is a perspective side view of a variant embodiment of the first example embodiment of a thermal management plate, FIG. 2B is a section view along plane A-A of the radiative plate of FIG. 2A, FIG. 2C is a front view of an example embodiment of a stack including the thermal management plates of FIG. 2A, FIG. 3A is a perspective top view of two thermal management plates according to a second example embodiment including a transfer of the convective type, FIG. 3B is a section view of the upper plate of FIG. 3A along a plane B-B, FIG. 4A is a perspective top view of two thermal management plates according to a variant of the second example embodiment, FIG. 4B is a section view of the upper plate of FIG. 4A along a plane C-C, seen from the lateral edge located in the background in FIG. 4A, FIG. 5 is a perspective top view of a portion of a stack of a high-temperature electrolyser according to the present invention including thermal management plates according to another variant of the second example embodiment, FIG. 6A is a perspective top view of a thermal management plate according to another variant of the second example embodiment, FIG. 6B is a section view of the plate of FIG. 6A along a plane D-D, FIG. 7A is a perspective top view of a thermal management plate according to a third example embodiment using phase-change materials, FIG. 7B is a section view of the plate of FIG. 7A along a plane E-E;

DETAILED DESCRIPTION OF PARTICULAR EMBODIMENTS

Figure 2A:
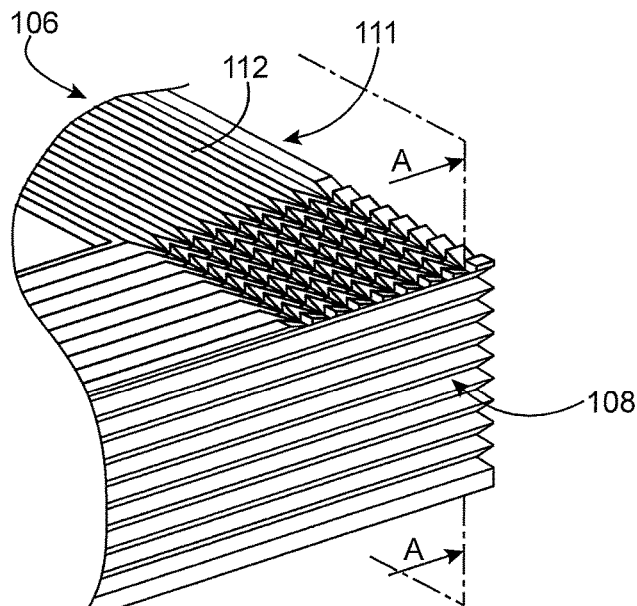

In FIG. 1C an example embodiment of a stack according to the invention for an electrochemical system such as a high-temperature electrolyser or a fuel cell can be seen.

The stack extends along a longitudinal axis X and includes ceramic cells 2 separated by interconnection plates 4 or interconnectors. An assembly A, formed from a cell 2 and two interconnectors 4 surrounding it, forms an elementary unit. The cells can, for example, be ceramic structures of the multi-layer type, including an electrolyte (typically produced as zirconia doped with yttria, or yttria-stabilised zirconia (YSZ) surrounded with two electrodes, one of which is made of a perovskite structure material (lanthanum strontium manganite, or LSM), and the other of which is made of a ceramic-metal composite (blend of YSZ and nickel, or Ni-YSZ). The interconnectors are typically made of Crofer® 22 APU alloy, which is a ferritic steel, Haynes 230® or a nickel-based alloy.

As an example, the compositions of Crofer® 22APU and Haynes 230® are given in the table below.

| Alloy | Mo | Ni | Fe | Mn | Cr | Al | W | Ti | La |
|---|---|---|---|---|---|---|---|---|---|
| Crofer ®22APU | 0.002 | 0.32 | Bal. | 0.45 | 22.33 | 0.13 | <0.001 | 0.1 | 0.1 |
| Haynes | 1.32 | Bal. | 0.74 | 0.49 | 22.32 | 0.42 | 14.53 | 0.025 | ND |

The stack also generally includes additional plates. Plates 6 are made of an electrical conducting material, preferably metal, for example Crofer 22 APU® ferritic steel, or F18TNb, etc. These plates 6 provide the thermal management of the electrochemical system by heat transfer by radiation of the heat generated when the electrochemical system is operating. Plates 6 will be designated below the "radiative plates".

Plates 6 are distributed in the stack, preferably periodically. For example, two radiative plates are separated by 4 to 12 elementary units. The number of elementary units separating two radiative plates 6 is chosen so as to limit the temperature gradient in the stack direction, i.e. in the current direction.

The stack according to the invention includes elementary units consisting of ceramic cells and interconnectors and the radiative plates; as we shall see below, radiative plates can also operate as interconnectors; however they replace only a proportion of them.

An example plate 6 is represented in FIG. 1A and a detailed view of it is represented in FIG. 1B.

In the represented example radiative plate 6 is square in shape, and thus has four lateral edges 8, forming an exchange or heat transfer surface.

Plates 6 have a surface for heat transfer by radiation which is greater than the surfaces of the interconnectors. Plates 6 have lateral edges 8 which are at least partly structured so as to increase the radiating surface. In FIG. 2A an example of such a plate 6 with such structuring can be seen. In FIG. 1B an enlarged view of a lateral edge 8 of the plate of FIG. 1A can be seen. In this example edge 8 has ribs 9 which are parallel to the longitudinal faces of the radiative plate, and the ribs have a V-shaped section. The alignment of the ribs is not restrictive. In particular, the case of ribs extending perpendicularly to the longitudinal faces of the plate, or slantwise, does not go beyond the scope of the present invention. In addition the structuring unit can be of any kind, and can be different from one edge to the next.

The lateral edges of the plates can be in the same vertical planes as those of the stack, and the tops of the ribs are then located in these vertical planes. As a variant, the structuring of the lateral edges is protruding, and the tops of the ribs are then protruding from the vertical planes of the edges of the stack.

The radiative plates preferably have a thickness, i.e. a dimension along longitudinal axis X, which is greater than or equal to that of the interconnectors. They then have a heat exchange surface before structuring of the lateral surface which is greater than that of the interconnectors.

We shall now give advantageous thickness values of the interconnector plates and of the radiative plates.

In the case of a "thin" interconnector plate, for example one manufactured from pressed plate, this plate can be between 0.1 mm and 1 mm thick, the radiative plate is advantageously between 10 mm and 50 mm thick, and is preferably 40 mm thick.

In the case of a "thick" interconnector plate, it can be between 5 mm and 10 mm thick; the radiative plate is advantageously between 5 mm and 20 mm thick, and is preferably 10 mm thick.

Plate 6 of FIG. 1A has a surface which is roughly equal to that of interconnectors 4 and cells 2, i.e. its edges are then roughly aligned with those of the interconnectors and of the cells.

In the represented example radiative plate 6 replaces the interconnector located at the end of a continuous stack of elementary units; one of the longitudinal faces 10 of the radiative plate then has channels for supplying the cells with combustible gas and oxidising gas. This configuration enables the stack to be simplified, and the electrical resistance and sealing problems to be reduced.

Alternatively, plate 6 can be positioned between a cell 2 and an interconnector, and drillings would then be made to make the fluid connections through the stack.

Figure 2B:
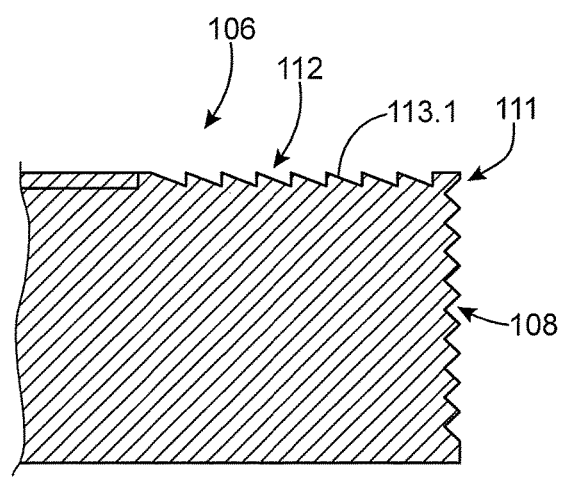

In FIGS. 2A and 2B a particularly advantageous variant embodiment of a radiative plate 106 according to the present invention can be seen, in which plate 106 has structuring on its lateral edges 8 and on the outer periphery of its longitudinal faces 10.

Figure 2C:
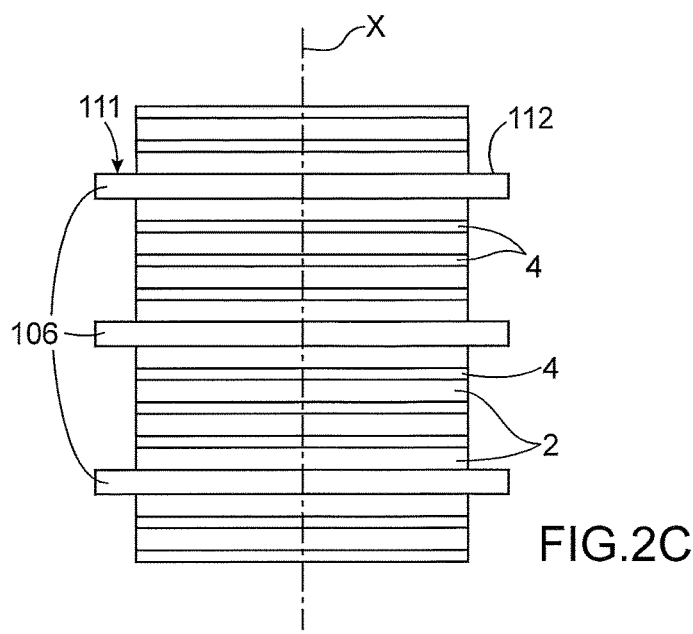

Plate 106 has a greater transverse section than that of the cells and of the interconnectors, such that it has an outer peripheral ridge 111 protruding from the middle lateral surface of the stack. In FIG. 2C a stack including plates 106 can be seen; the protruding ridges 111 of radiative plates 106 form heat exchange fins.

The longitudinal faces of ridge 111 have a structuring of its lateral edges 108 in a similar manner to plate 6, and advantageously a structuring 113 of outer edge 112 of its longitudinal faces. As can be seen in FIG. 2B, this structuring 113, seen in a section view, has a sawtooth profile. The largest face 113.1 of the teeth is advantageously facing outside the stack, and the largest surfaces are then facing outside and the heat radiating mainly outwards.

Alternatively, it may be decided that only the longitudinal faces will have structuring, and that the lateral edges will be smooth or, conversely, that only the lateral edges will be structured, and the longitudinal faces will be smooth. Partial structuring of the lateral edges and/or of the longitudinal faces is also conceivable.

In addition, the square shape of the plates, and more generally of the elements of the stack, is not restrictive, and a disc shape, for example, does not go beyond the scope of the present invention.

We shall give, as an example, a dimensioning of the plates.

In the hypothesis of an imposed voltage of 1.5 Volts/cell with cells having an active surface of 77.44 cm$^2$, radiative plates positioned every five cells, interconnectors 1 mm thick, a gas inlet temperature and a thermalisation of the sheath surrounding the stack at 800° C., structured radiative plates 6 are 44 mm thick. In the case of interconnectors which are 10 mm thick the structured radiative plates are 11 mm thick.

The thickness of the radiative plates depends on the level of structuring of their lateral edges, and possibly of the longitudinal faces.

The lateral edges and/or the outer edges of the longitudinal faces of the radiative plates can advantageously be coated with a material having an emissivity close to 1. For example, the coating can be $Pr_2NiO_{4+\delta}$, obtained by the pyrosol method.

It is also conceivable to increase the radiative losses, and by this means to cool the stack by controlling the temperature of the environment outside the stack, for example that of a sheath surrounding the stack. Under these circumstances, dynamic control of the temperature of the electrolyser or of the fuel cell can be obtained. Similarly, in endothermic mode, transfer of heat in radiative form will be facilitated by controlling the temperature of the external sheath.

In the examples representing the middle planes lateral edges are roughly parallel to longitudinal axis X of the stack; however, these planes could be inclined relative to longitudinal axis X.

As a variant, it can be decided to make the outer lateral ridge thicker than the central portion of the radiative plate, also increasing the radiative losses by this means; this thickened ridge can also be structured.

Figure 8A:
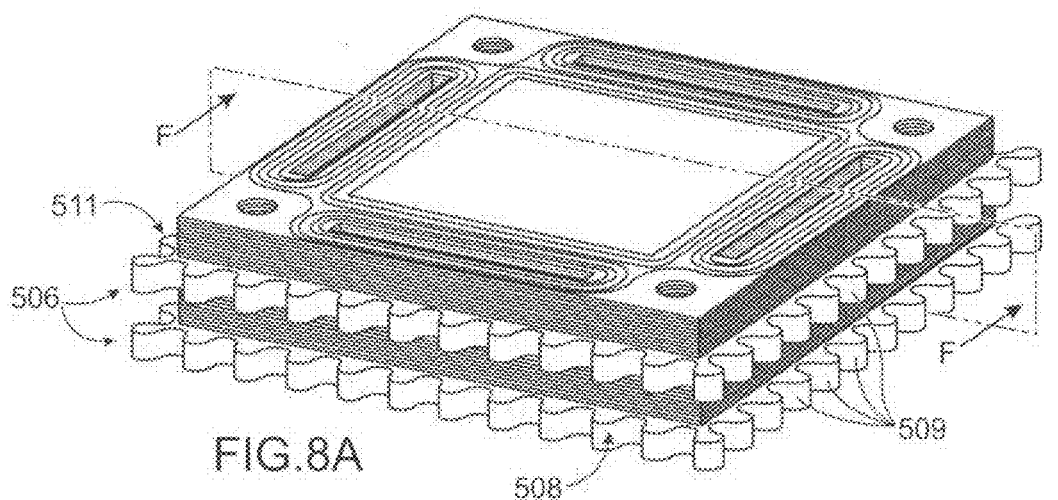
FIG. 8A is a perspective view of a stack including thermal management plates according to a variant embodiment.
Figure 8B:
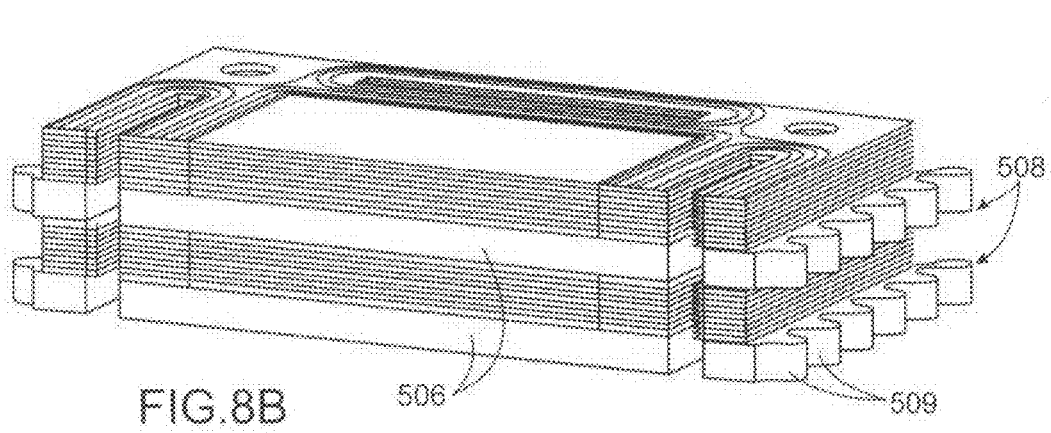
FIG. 8B is a section view of the stack of FIG. 8A along a plane F-F.

In FIGS. 8A and 8B a variant embodiment of radiative plates 506 can be seen. In this variant the radiative plates include a protruding peripheral ridge 511 the lateral edge of which 508 has undulations 509. In the represented example these undulations 509 have an axis parallel to that of the stack. The radiating surface is increased by this means.

Figure 9A:
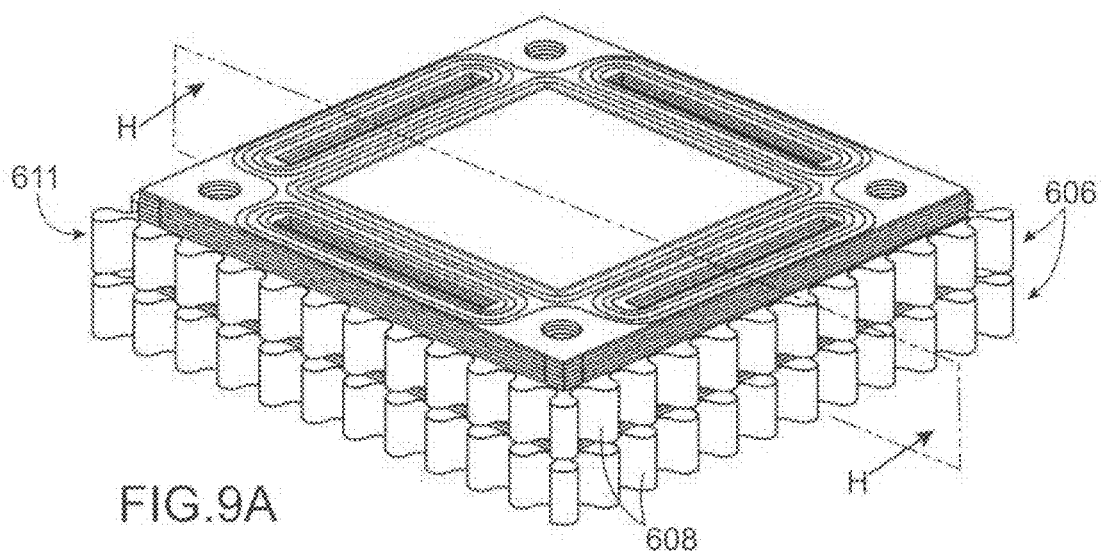
FIG. 9A is a perspective view of a stack including thermal management plates according to a variant embodiment.
Figure 9B:
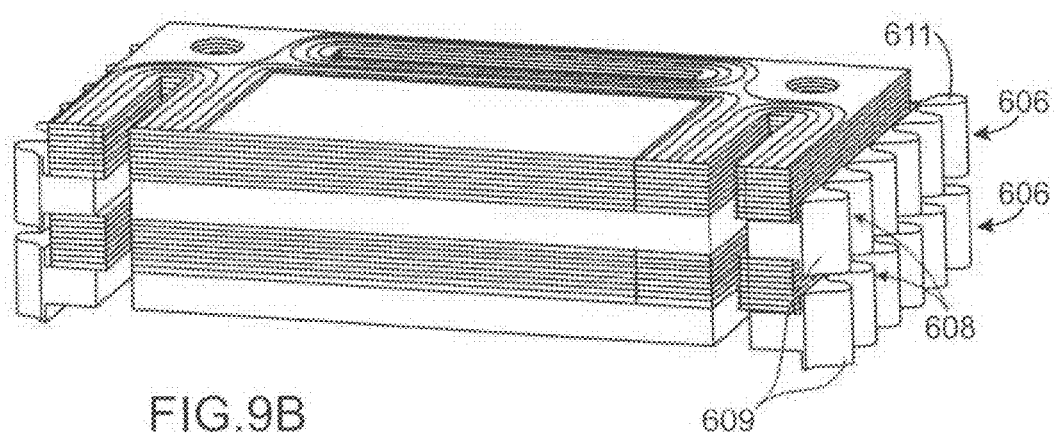
FIG. 9B is a section view of the stack of FIG. 9A along a plane H-H.

In FIGS. 9A and 9B another variant embodiment of radiative plates 606 can be seen in which they differ from those of FIGS. 8A and 8B in that their peripheral ridge 611 is thicker than that of the transverse section of the portion of the radiative plate located within the stack. As can be seen in FIG. 9B, peripheral ridge 611 of the radiative plates has a roughly T-shaped profile. Lateral edge 608 also has undulations 609. The radiating surface is increased further. Other profiles producing an increased radiating surface are conceivable, for example an L-shaped profile.

Figure 3A:
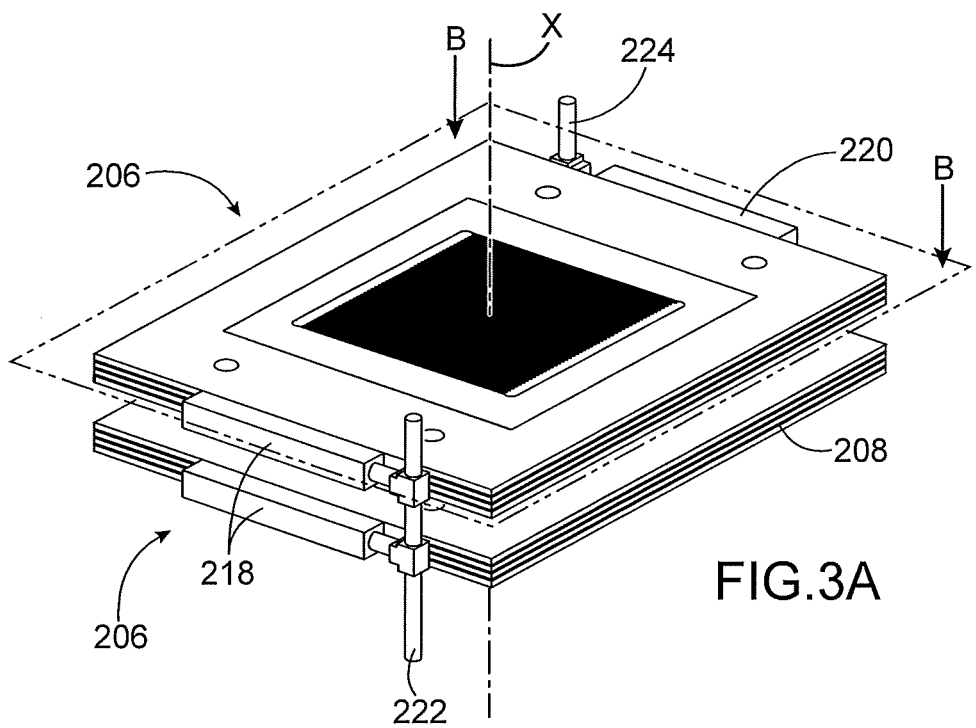
Figure 3B:
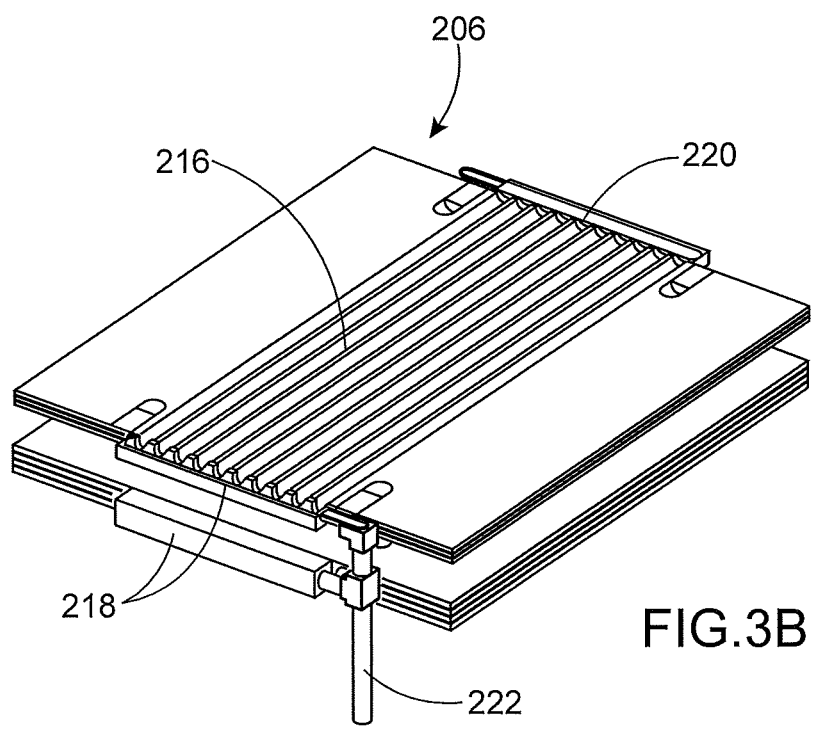

In FIGS. 3A and 3B a second example embodiment of a radiative plate according to the present invention can be seen which, in addition to cooling by radiative transfer, incorporates cooling by convection. Conversely, in endothermic mode, these exchanges by convection will enable heat to be transferred to the stack.

Plates 206 represented in FIGS. 3A and 3B are intended also to form interconnectors. In FIG. 3A the cells and the interconnectors have been omitted.

In FIG. 3B a section view by section plane C-C of plate 206 can be seen. Radiative plate 206, like plates 6 and 106, has structuring of at least a proportion of its lateral edges 208, to provide cooling by radiative transfer, and means for causing a heat transfer fluid to flow within it, causing heat evacuation by convection. In the represented example the flow-inducing means are formed by channels 216 extending between two parallel edges 208 of plate 206, parallel with one another. Channels 216 are connected at a first end to a supply connector 218 and at a second end to an evacuation connector 220. In this example embodiment channels 216 are supplied in parallel, and all plates 206 are fed in parallel by a tube 222 connected to connectors 218 supplying all plates 206, and are evacuated in parallel through a tube 224 connected to connectors 220 for evacuating all plates 206. The heat transfer flow channels may be arranged in any manner.

In this example the heat transfer fluid is a gas different to that used in electrolysis when the cell stack or electrolyser is in operation. This gas is, for example, a neutral gas flowing in radiative plates 206 recovering any excess heat generated. There is electrical insulation between radiative plates 206. For example, electrical insulation is formed at the junction of tubes 222 and supply connectors 218, for example by using mica seals.

Figure 4A:
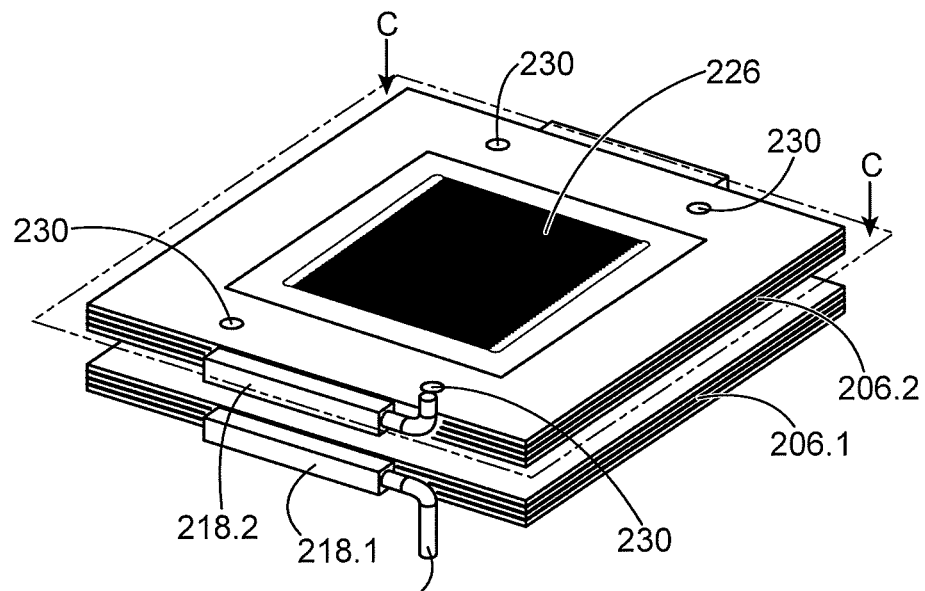
Figure 4B:
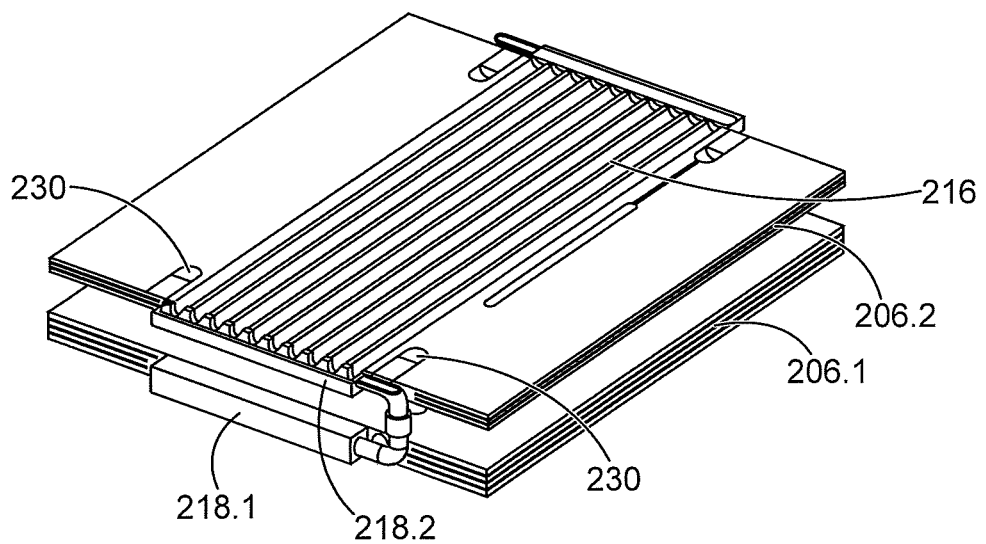

In FIGS. 4A and 4B, a variant of the system of FIGS. 3A and 3B can be seen, in which heat transfer flow channels 216 are connected in series. A heat transfer fluid supply pipe 222 supplies supply connector 218.1 of first plate 206.1 of the stack, the evacuation connector (not visible) of first plate 206.1 is connected to supply connector 218.2 of following plate 206.2 and so forth, such that the heat transfer fluid flows through all the plates.

In the represented examples plates 206 are intended to replace interconnectors; they therefore also have channels 226 for supplying oxidising gas and fuel gas in their central portion. Channels 226 are themselves supplied via branch connections 230 positioned on the edges of the plates and channels formed inside plates 206.

In a system with an imposed voltage of 1.5 Volts/cell, cells with a 77.44 cm$^2$ active area, radiative plates 206 positioned every five cells, a stack temperature not exceeding 840° C., steam introduced at 800° C. at a flow rate of 2 l/min., and interconnectors 1 mm thick, it was determined that the thickness of radiative plates 206 was approximately 42 mm. The distribution of the heat dissipated in the stack is then as follows: approximately 70.5% of the heat is evacuated by the radiative losses, 27% of the heat is evacuated by the cathodic and anodic fluids, and 2.5% by the heat transfer fluid. Convection cooling therefore enables thermal management of the stack to be improved by additional cooling by radiative transfer. The quantity of heat evacuated by convection can be increased, for example either by increasing the flow rate of the fluid, or by choosing a more efficient heat transfer fluid.

Figure 5:
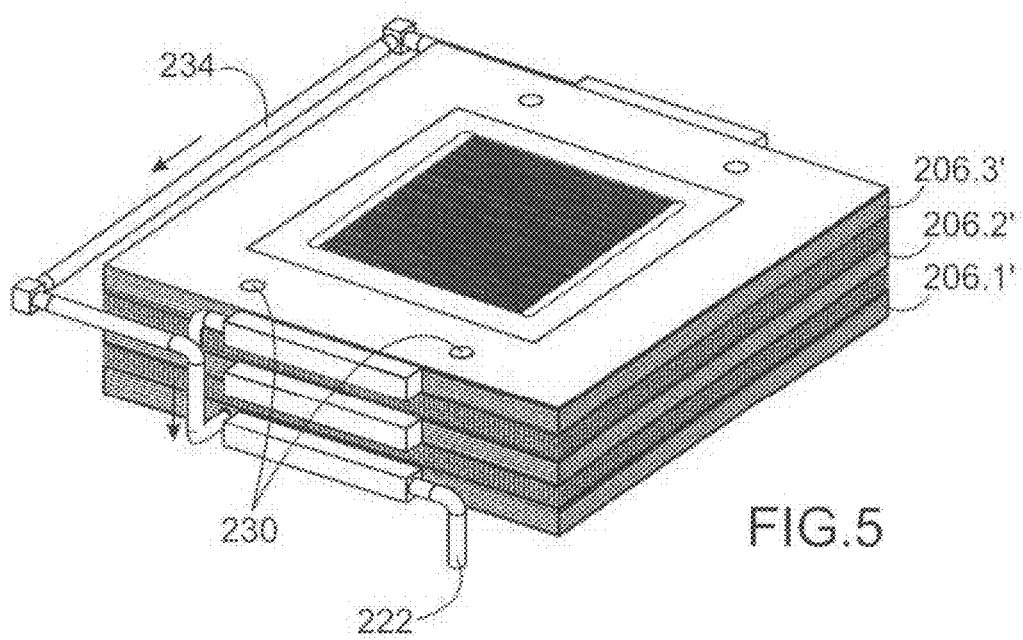

In FIG. 5 a variant embodiment of the plates of FIGS. 3A to 4B can be seen, in which the convection cooling means use an anodic or cathodic electrolysis gas.

In FIG. 5 a stack of radiative plates 206.1', 206.2', 206.3' and of cells 2 are represented. Radiative plates 206.1', 206.2', 206.3' are similar to radiative plates 206 of FIGS. 3A to 4B; pipe 222 supplies radiative plates 206.1', 206.2', 206.3' with electrolysis gas, in the example represented in series. At the outlet of plate 206.3' the collected electrolysis gas is injected in cells 2 by pipe 234 through a lateral branch connection of first plate 206.1. The arrows represent the flow of the gas. The electrolysis gas is, for example, steam. The fluid connection connecting two radiative plates has electrical insulation, for example achieved by means of a mica seal.

Due to this arrangement the stack is cooled by convection, at the same time as the electrolysis gases are preheated, using directly the heat generated in close proximity to the cells.

According to another variant it is conceivable to make a gas also flow also around the stack which is located in its sheath, to facilitate the convective exchanges.

Figure 6A:
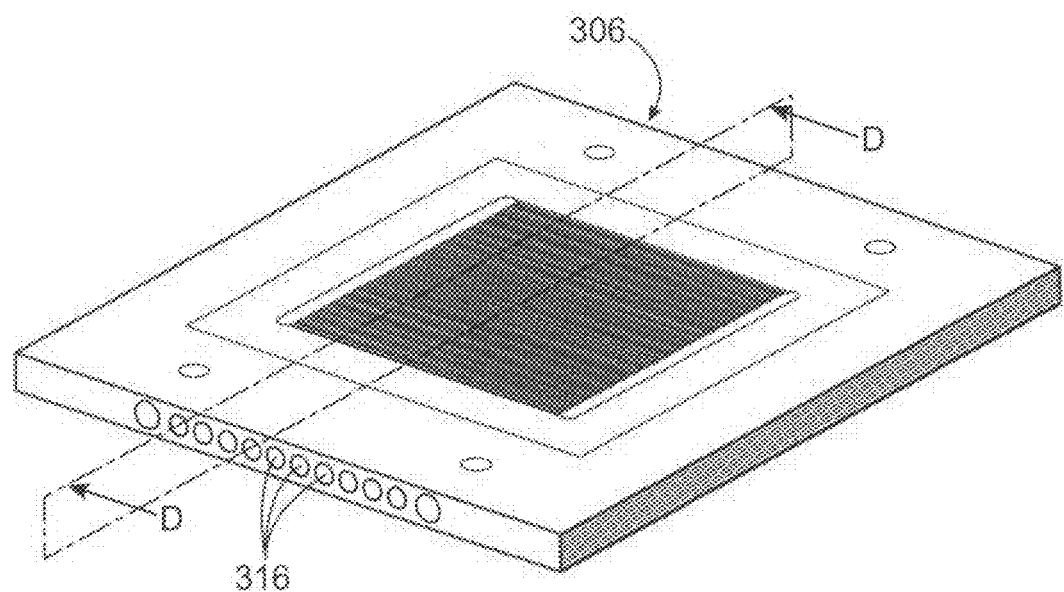
Figure 6B:
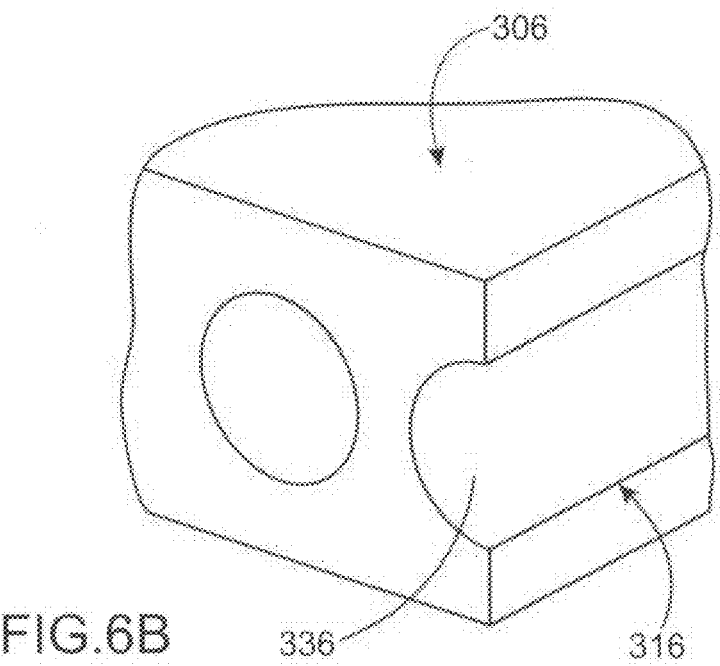

In another variant represented in FIGS. 6A and 6B, in the case of an SOFC cell stack operating in reforming mode in methane, channels 316 of radiative plates 306 are covered with a steam reforming catalyst 336, for example of the Ru-, Rh- (or other-) doped ceria type. By this means the natural gas is pre-reformed before it is introduced into the cells of the fuel cell. Since this reaction is endothermic it cools the stack by convection.

During operation the electrochemical system may be subject to voltage and temperature cycles. These transitions can cause temperature gradients which are prejudicial to the mechanical integrity of the cells. In addition, a very high temperature, even temporary, of over 850° C., may damage the metal materials of the stack.

Figure 7A:
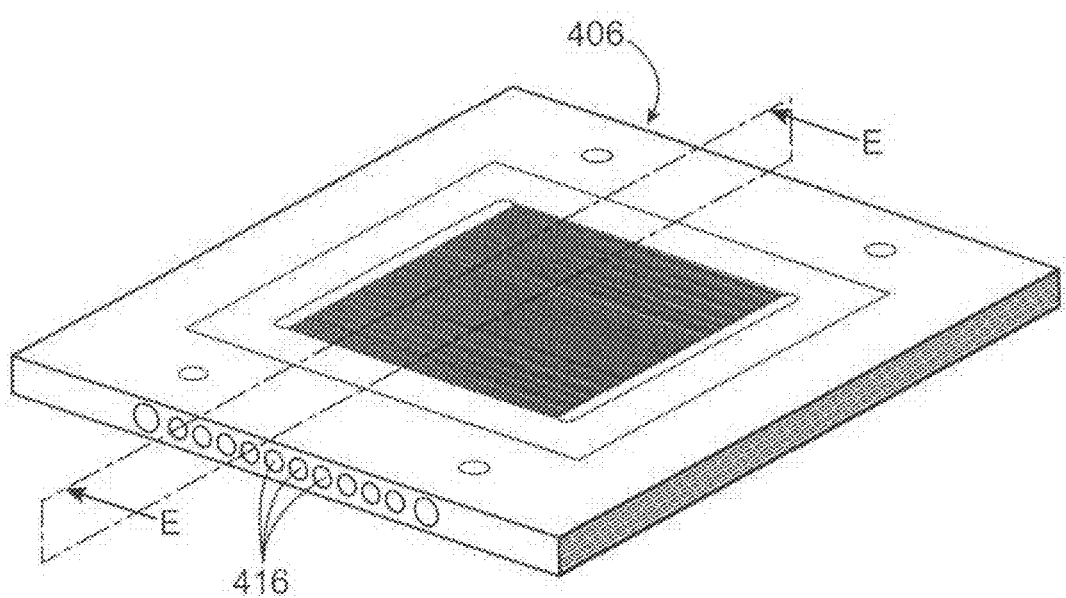
Figure 7B:
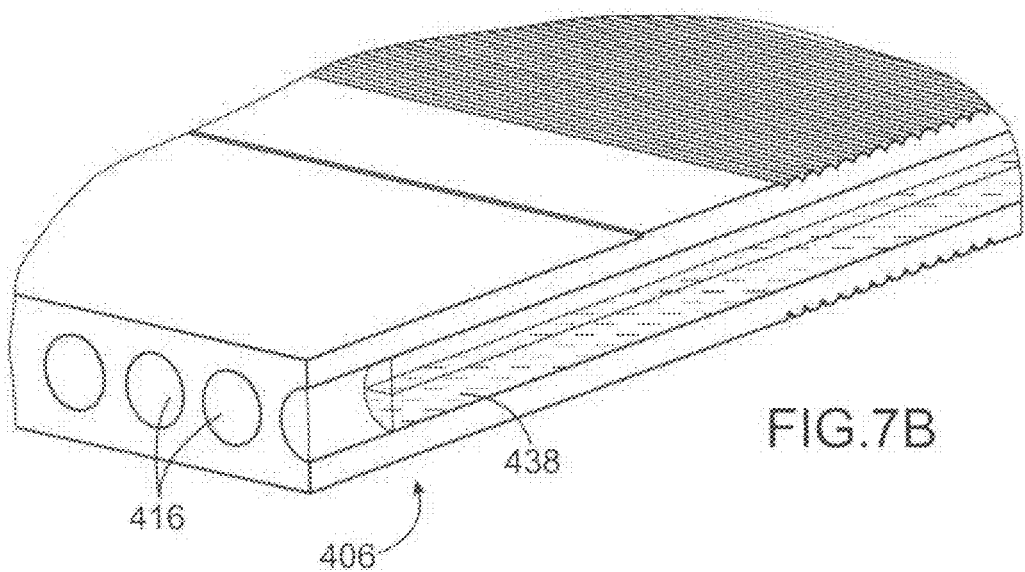

The example radiative plate embodiment represented in FIGS. 7A and 7B advantageously allows sudden changes of temperature within the stack, and temperatures of over 850° C., to be limited.

As in the second example embodiment, radiative plate 406 contains channels 416 extending between two parallel edges of plate 406, parallel to one another. However, these channels contain a phase-change material 438, which changes phase between 800° C. and 850° C., in the operating temperature range of an electrolyser and of a high-temperature fuel cell stack. The latent heat required to transform phase-change material 438 is supplied by the heat generated by the electrolyser; this heat is therefore absorbed by phase-change material 438, limiting the temperature rise above a threshold which is dangerous for the stack.

Phase-change material 438 may be a eutectic such that it melts at a constant temperature, enabling the stack to be maintained at a constant temperature during this phase change. For example, it may be an alloy with a solidus temperature of close to 800° C. and a liquidus temperature of close to 850° C. This eutectic material may, for example, be an Ag (96.9%)-Si alloy with a melting point of 835° C. alternatively, it may be Cu—Si (85%) with a melting point of 802° C., or LiF with a melting point of 848° C. and, for lower-temperature applications, Ag—Cu (28%), with a melting point of 780° C. Other alloys may be envisaged, such as Ag58-Cu32-Pd10 (853° C.-824° C.), Au60-Cu20-Ag20 (845° C.-835° C.) or, at lower temperature, Ag95-Al5 (830° C.-780° C.) or Ag68-Cu27-Pd5 (814° C.-794° C.). The solidus and of liquidus temperatures, respectively, are given between brackets.

Phase-change material 438 may also be a molten salt which is less costly. If molten salts are used the radiative plates must be protected from corrosion by boron nitride, for example. For example, as a molten salt NaCl can be used, with a melting point of 800° C., or alternatively $Na_2Co_3$, with a melting point of 850° C. By using NaCl as a phase-change material in a radiative plate according to the invention every five modules, a temperature of 800° C. may be guaranteed for 30 min at 1.5 V by filling 10 channels measuring 10 mm in diameter by 200 mm in length. For the purposes of the calculation a power to be evacuated of 100 W, the latent heat of NaCl of 472 kJ/kg, and its density of 2160 kg/m³ were considered.

Due to the use of a phase-change material, an upper threshold and a lower threshold may be introduced for the stack temperature in order to limit the large temporary temperature variations, called transients.

In seeking to optimise hydrogen generation in accordance with the cost of electricity, it may be decided with this system to operate at a high potential (1.5 V) when the price of electricity is low, and to use the heat released to melt this alloy. Then, when the price of electricity is high, the electrolyser operates at a lower voltage of 1.3 V, in endothermic mode. The heat stored by the phase-change material is then returned to the stack when it solidifies, and forms an available heat source to increase the efficiency of the electrolysis.

In the examples represented in FIGS. 3A to 7B, the channels are linear and parallel to one another, but this configuration is in no way restrictive, and curved channels, or channels of any other shape, distributed in several layers and/or distributed in a non-uniform manner in the plate, do not go beyond the scope of the present invention.

The radiative plates with channels may be produced by powder metallurgy using a Hot Isostatic Pressing (HIP) process.

In this case the assembly forming the distribution channels is obtained by bent metal tubes surrounded by the material forming the plate initially introduced in powder form. The assembly is pressed at high temperature to obtain a dense part, the outer faces of which can be made good by machining to obtain the final dimensions. As a variant, it may be decided to form the channels by making a first series of parallel drillings, and then to make a second series of two drillings perpendicular to the drillings of the first series, such that the drillings of the first series are put in communication with one another. The outlet areas are then closed by welding plugs, for example of cylindrical shape with the drilling's dimensions. This variant has the advantage of a lower cost price than the HIP method.

According to another unrepresented example embodiment, cooling by conduction is combined with cooling by radiative transfer. For example, the stack is housed in a thermal conductive sheath, and the radiative plates have a transverse section greater than that of the cells and of the interconnectors, such that they are in contact with the sheath; they are then connected thermally to the sheath. A proportion of the heat generated in the stack is evacuated by conduction through the radiative plates and the sheath, the temperature of which can be controlled. In this example embodiment electrical insulation is provided between the radiative plates and the sheath to prevent a short circuit between the radiative plates.

A combination of the variant embodiments described above does not go beyond the scope of the present invention. For example, a radiative plate containing channels in which a neutral gas flows, providing additional cooling by convection, channels in which an electrolysis gas is heated, also providing additional cooling by convection, and channels containing a phase-change material, do not go beyond the scope of the present invention. Any other combination is conceivable.

The radiative plates, in addition to allowing simplified thermal management of the stack, can also enable a section of the remainder of the stack to be isolated if a cell in this section fails. To accomplish this the radiative plates can be fitted with an individual electrical connection. It then becomes possible at any time to establish a bridge by connecting the two plates positioned at each end of the section. This simple operation enables this zone of the stack, in which one of the cells is damaged, to be electrically isolated. The stack may then continue to operate, whilst preventing current from traversing the damaged cell.

Finally, even if there is no phase-change material, the radiative plates cause a certain thermal inertia in the stack, by this means limiting the appearance of high transient temperature gradients.

In the case of high-temperature electrolysers the invention enables the electrolyser to be prevented from being subjected to great heat, allowing it to be operated at high steam conversion rates.

By means of the invention the thermal properties of high-temperature electrolysers and fuel cell stacks may be managed efficiently and relatively simply. The means used, i.e. the radiative plates, also have great operating safety, and great flexibility in terms of the cooling modes which may be implemented. Similarly, these plates can be used to provide heat required for the endothermic operating mode.

The invention claimed is:

1. An electrochemical system, comprising:
   a stack having a longitudinal axis and comprising ceramic units, interconnectors, and radiative plates for transferring heat to and from the stack, wherein the stack includes at least one section along the longitudinal axis in which the ceramic units and the interconnectors are alternating; and
   electrodes made of a ceramic material,
   wherein:
   the radiative plates comprise at least one lateral edge with a surface through which a heat exchange occurs by radiation with an exterior of the stack;
   the surface is at least partly structured;
   the radiative plates are positioned in the stack such that two of the ceramic units are arranged on two faces of each of the radiative plates and are in direct contact with the two faces of each of the radiative plates; and
   at least one of the interconnectors is separated from a nearest radiative plate by two of the ceramic units.

2. The electrochemical system according to claim 1, wherein:
   the interconnectors are between 0.1 mm and 15 mm thick; and
   at least one of the radiative plates is between 5 mm and 50 mm thick, and is thicker than the interconnectors.

3. The electrochemical system according to claim 1, wherein at least one of the radiative plates has a transverse section greater than that of the ceramic units, and greater than that of the interconnectors, such that the transverse section has a peripheral ridge protruding from the stack.

4. The electrochemical system according to claim 3, wherein the peripheral ridge includes a lateral edge with a surface at least partly structured, and two longitudinal faces, at least one longitudinal face of which is at least partly structured.

5. The electrochemical system according to claim 4, wherein the surface of the lateral edge, the at least one longitudinal face, or both, is covered with a material having emissivity close to 1, or with $Pr_2NiO_{4+\delta}$.

6. The electrochemical system according to claim 3, wherein the peripheral ridge is thicker than a portion of the at least one of the radiative plates positioned inside the stack.

7. The electrochemical system according to claim 3, wherein at least one of the radiative plates includes means of thermal transfer by convection formed by channels made in the at least one of the radiative plates and extending roughly in its plane, wherein the thermal transfer occurs by a fluid flowing in the channels.

8. The electrochemical system according to claim 7, wherein the fluid is fluid different from a fluid used in electrolysis reactions of the electrochemical system.

9. The electrochemical system according to claim 7, wherein the fluid is an electrolysis gas used in at least electrolysis reactions of the electrochemical system, the system including means connecting the channels to an electrolysis gas supply circuit.

10. The electrochemical system according to claim 1, wherein two or more of the radiative plates are distributed periodically in the stack, or in every 4 to 12 of elementary units, in which an elementary unit of the elementary units is formed by one of the ceramic cells and two of the interconnectors.

11. The electrochemical system according to claim 10, wherein the two or more of the radiative plates include an electrical connection configured to electrically isolate cells located between the two or more of the radiative plates.

12. The electrochemical system according to claim 1, wherein at least one of the radiative plates has undulations on at least one of the lateral edge.

13. The electrochemical system according to claim 1, wherein at least one of the radiative plates has at least one cavity including a phase-change material that changes phase at desired operating temperatures of the electrochemical system.

14. The electrochemical system according to claim 13, wherein the phase-change material is a eutectic material having a solidus temperature of about 800° C. and a liquidus temperature of about 850° C.

15. The electrochemical system according to claim 13, wherein the phase-change material is a molten salt, or is NaCl.

16. The electrochemical system according to claim 1, wherein at least two of the radiative plates comprise an electrical connection configured to electrically isolate cells located between the at least two of the radiative plates.

* * * * *